(12) United States Patent
Sanada et al.

(10) Patent No.: US 7,308,833 B2
(45) Date of Patent: Dec. 18, 2007

(54) TORQUE SENSOR, WIRE HARNESS, ELECTRIC POWER STEERING ASSEMBLY AND TERMINAL HOLDER

(75) Inventors: Takahiro Sanada, Kashihara (JP); Yoshirou Sakai, Kyotanabe (JP); Satoshi Mizushima, Tokyo (JP); Masaaki Nagai, Tokyo (JP); Daisuke Kimoto, Tokyo (JP)

(73) Assignees: Favess Co., Ltd., Aichi (JP); Koyo Seiko Co. Ltd., Osaka (JP); Hitachi Cable Ltd, Tokyo (JP); Toyoda Koki Kabushiki Kaisha, Kariya-shi (JP)

( * ) Notice: Subject to any disclaimer, the term of this patent is extended or adjusted under 35 U.S.C. 154(b) by 26 days.

(21) Appl. No.: 11/136,588

(22) Filed: May 25, 2005

(65) Prior Publication Data
US 2005/0274202 A1 Dec. 15, 2005

(30) Foreign Application Priority Data
May 26, 2004 (JP) ............................. 2004-156280

(51) Int. Cl.
*G01L 3/00* (2006.01)
(52) U.S. Cl. .................. 73/862.08; 73/862; 439/342; 439/296
(58) Field of Classification Search ........... 73/862.338, 73/862, 862.08; 439/402, 342, 296
See application file for complete search history.

(56) References Cited

U.S. PATENT DOCUMENTS

| | | | |
|---|---|---|---|
| 4,181,393 A | * | 1/1980 | Lill ............................. 439/402 |
| 4,225,206 A | | 9/1980 | Roman, Jr. |
| 4,448,275 A | | 5/1984 | Kitagawa et al. |
| 4,466,677 A | * | 8/1984 | Lyman ........................ 439/192 |
| 5,046,372 A | * | 9/1991 | Taniguchi et al. ...... 73/862.335 |
| 5,586,901 A | * | 12/1996 | Muta ........................... 439/342 |
| 5,712,563 A | * | 1/1998 | Kawagoe et al. ....... 324/207.19 |
| 5,812,044 A | * | 9/1998 | Sakamoto .................... 335/299 |
| 5,936,501 A | * | 8/1999 | Seino .......................... 335/289 |

FOREIGN PATENT DOCUMENTS

| | | |
|---|---|---|
| EP | 0 600 418 A1 | 6/1994 |
| EP | 0 716 478 A2 | 6/1996 |
| EP | 0 716 479 A2 | 6/1996 |
| EP | 0 949 721 A1 | 10/1999 |
| JP | 2003-11833 | 1/2003 |

OTHER PUBLICATIONS

European Search Report dated Oct. 4, 2005.

* cited by examiner

*Primary Examiner*—Harshad Patel
*Assistant Examiner*—Punam Patel
(74) *Attorney, Agent, or Firm*—Westerman, Hattori, Daniels & Adrian, LLP.

(57) ABSTRACT

In a torque sensor having lead pins connected to a wire harness, the wire harness includes: a plurality of lead wires; a plurality of connection terminals each having a sleeve mounted around each of the lead pins and a connection portion extended from an outer periphery of the sleeve to be connected with one end of the lead wire; and an electrically insulating terminal holder for holding the plural connection terminals. The terminal holder includes: a sleeve holder portion for holding the sleeves in mutually spaced relation in order to prevent the sleeves from contacting each other; and a connection-portion holder portion for holding the connection portions in mutually spaced relation in order to prevent the connection portions from bending to contact each other.

6 Claims, 9 Drawing Sheets

TORQUE SENSOR, WIRE HARNESS, ELECTRIC POWER STEERING ASSEMBLY AND TERMINAL HOLDER

BACKGROUND OF THE INVENTION

The present invention relates to torque sensor, wire harness, electric power steering assembly and terminal holder.

Conventionally, an electric power steering assembly employs a torque sensor for detecting a steering torque. A torque applied to a steering shaft is detected by the torque sensor so that a steering assist force can be controlled based on the torque thus detected.

The torque sensor detects the torque as follows. A cylindrical gear portion is provided to each of an input shaft and an output shaft which are interconnected by means of a torsion bar and which constitute a steering shaft, in a portion where the steering shaft is surrounded by a sensor coil. The gear portions are so provided as to oppose to each other. A torque applied to the steering shaft causes the gear portions to be angularly displaced relative to each other, while the relative angular displacement is detected by way of a variation of impedance produced in the sensor coil.

Such an electrical power steering assembly includes: the steering shaft; the sensor coil disposed on an outer periphery of the steering shaft so as to detect the torque applied to the steering shaft; a plurality of lead pins projecting from an outer periphery of the sensor coil; a control unit for detecting a steering torque based on a variation of the impedance produced in the sensor coil and for controlling an electric motor for steering assist depending on the detected torque; and a control board constituting the control unit.

The torque sensor for use in the electric power steering assembly includes one wherein the control board is disposed in close vicinity of the sensor coil and the lead pins are directly connected with the control board without using the wire harness (see, for example, Japanese Unexamined Patent Publication No.2003-11833).

This torque sensor has the lead pins inserted in throughholes formed in a substrate portion constituting the control board and connected with the substrate portion by means of solder for electrical conductivity.

In an arrangement wherein the wire harness is used for connecting the lead pins with the control board of a control unit spaced away from the sensor coil, however, each of the lead wires of the wire harness must be connected with each of the lead pins and soldered thereto. This results in a low efficiency of a wiring operation.

In order to increase the efficiency of the wiring operation when the wire harness is connected with the lead pins, it can be contemplated to provide a connection terminal and a terminal holder to permit the wire harness to be mounted to the lead pins in one step. The connection terminal includes: a sleeve through which the lead pin can be inserted, and a connection portion to which the lead wire of the wire harness is connected. The terminal holder is adapted for integral retention of the sleeves.

However, a dip soldering operation of dipping a tip of the lead pin with the sleeve mounted therearound into a high-temperature solder bath is performed for ensuring the connection between the lead pin and the sleeve. During the soldering operation, the connection portions may be inadvertently bent to bring the connection terminals into contact with each other. That is, this approach is somewhat decreased in the reliability of preventing the contact between the connection terminals although the efficiency of the wiring operation is increased.

SUMMARY OF THE INVENTION

In view of the foregoing, the present invention has an object to provide torque sensor, wire harness, electric power steering assembly and terminal holder which are adapted for more positive prevention of the contact between the connection terminals and feature a highly efficient wiring operation.

In accordance with the present invention, there is provided a torque sensor including: a sensor coil disposed on an outer periphery of a rotary member applied with a torque for detecting the torque applied to the rotary member based on a variation of impedance; a plurality of lead pins projecting from an outer periphery of the sensor coil; and a wire harness having one end connected with the lead pins. The wire harness includes: a plurality of lead wires having electrical conductivity; a plurality of connection terminals each having a tubular sleeve mounted around each of the lead pins and a connection portion extended from an outer periphery of the sleeve in a direction perpendicular to an axial direction of the lead pin to be connected with one end of the lead wire; and an electrically insulating terminal holder for retaining the plural connection terminals. The terminal holder includes: a sleeve holder portion for holding the sleeves in mutually spaced relation in order to prevent the sleeves from contacting each other; and a connection-portion holder portion for holding the connection portions in mutually spaced relation in order to prevent the connection portions from bending to contact each other.

According to the present invention, the terminal holder includes the sleeve holder portion for holding the sleeves in mutually spaced relation such as to obviate the contact between the sleeves, and the connection-portion holder portion for holding the connection portions in mutually spaced relation such as to prevent the connection portions from bending to contact each other. Therefore, the terminal holder not only provides a one-step operation of connecting the wire harness with the lead pins but also prevents the connection portions from bending to contact each other during the soldering operation and the like. That is, the terminal holder is adapted to surely fix the individual connection terminals to places.

In the above torque sensor, the sleeve holder portion is preferably formed to have a thickness with respect to the pin axial direction such that a pin-tip-side level thereof is lower than that of the connection-portion holder portion, and preferably retain the sleeve at place away from a pin-tip-side end face of the sleeve in the pin axial direction.

In this case, the sleeve holder portion is formed to have the thickness with respect to the pin axial direction such that the pin-tip-side level thereof is lower than that of the connection-portion holder portion, and retains the sleeve at place away from the pin-tip-side end face of the sleeve in the pin axial direction. Therefore, the terminal holder can be prevented from being fusedly damaged by heat from a high-temperature solder bath during the dip soldering operation.

In the above torque sensor, the connection-portion holder portion preferably include: a partitioning wall located between the connection portions for separating the connection portions from each other; and support portions for supporting the connection portions separated by the partitioning wall.

In this case, the partitioning wall is located between the connection portions to separate the connection portions from each other whereas the support portions support the connection portions thus separated. This provides an even more sure prevention of the contact between the terminals.

In the above torque sensor, the sleeve holder portion is preferably formed with a plurality of through-holes extended therethrough in the pin axial direction for allowing the sleeves to be removably inserted therein, whereas the connection-portion holder portion is preferably configured to allow the connection portions to be removably attached thereto.

In this case, the terminal holder is separable from the connection terminals so that the terminal holder can be produced as an independent part. Therefore, the production costs can be reduced as compared with a case where the terminal holder and the connection terminals are produced in one piece.

In accordance with the present invention, there is further provided a wire harness having one end connected to a plurality of lead pins projecting from an outer periphery of a sensor coil, including: a plurality of lead wires having electrical conductivity; a plurality of connection terminals each including a tubular sleeve mounted around each of the lead pins and a connection portion extended from an outer periphery of the sleeve in a direction perpendicular to an axial direction of the lead pin so as to be connected with one end of the lead wire; and an electrically insulating terminal holder for holding the plural connection terminals. The terminal holder includes: a sleeve holder portion for holding the sleeves in mutually spaced relation in order to prevent the sleeves from contacting each other; and a connection-portion holder portion for holding the connection portions in mutually spaced relation in order to prevent the connection portions from bending to contact each other.

In accordance with the present invention, there is also provided an electrical power steering assembly equipped with a torque sensor, including: a steering shaft; a sensor coil disposed on an outer periphery of the steering shaft for detecting a torque applied to the steering shaft; a plurality of lead pins projecting from an outer periphery of the sensor coil and a control unit for detecting a steering torque based on a variation of impedance produced in the sensor coil and for controlling an electric motor for steering assist depending on the detected torque. The steering assembly employs the aforementioned wire harness as a wire harness for interconnecting the lead pins and a control board constituting the control unit.

In accordance with the present invention, there is still further provided an electrically insulating terminal holder for holding a plurality of connection terminals each including a tubular sleeve and a lead-wire connection portion extended from an outer periphery of the sleeve in a direction perpendicular to an axial direction of the sleeve. The terminal holder is composed of a sleeve holder portion for holding the sleeves in mutually spaced relation in order to prevent the sleeves from contacting each other; and a connection-portion holder portion for holding the connection portions in mutually spaced relation in order to prevent the connection portions from bending to contact each other.

BRIEF DESCRIPTION OF THE DRAWINGS

FIG. 7($a$) is a view as seen along a direction of the arrow B in FIG. 6, whereas FIG.7($b$) and FIG. 7($c$) are sectional views taken along the line C-C and the line D-D in FIG. 7($a$), respectively;

DETAILED DESCRIPTION

The preferred embodiments of the invention will hereinbelow be described with reference to the accompanying drawings.

Figure 1:
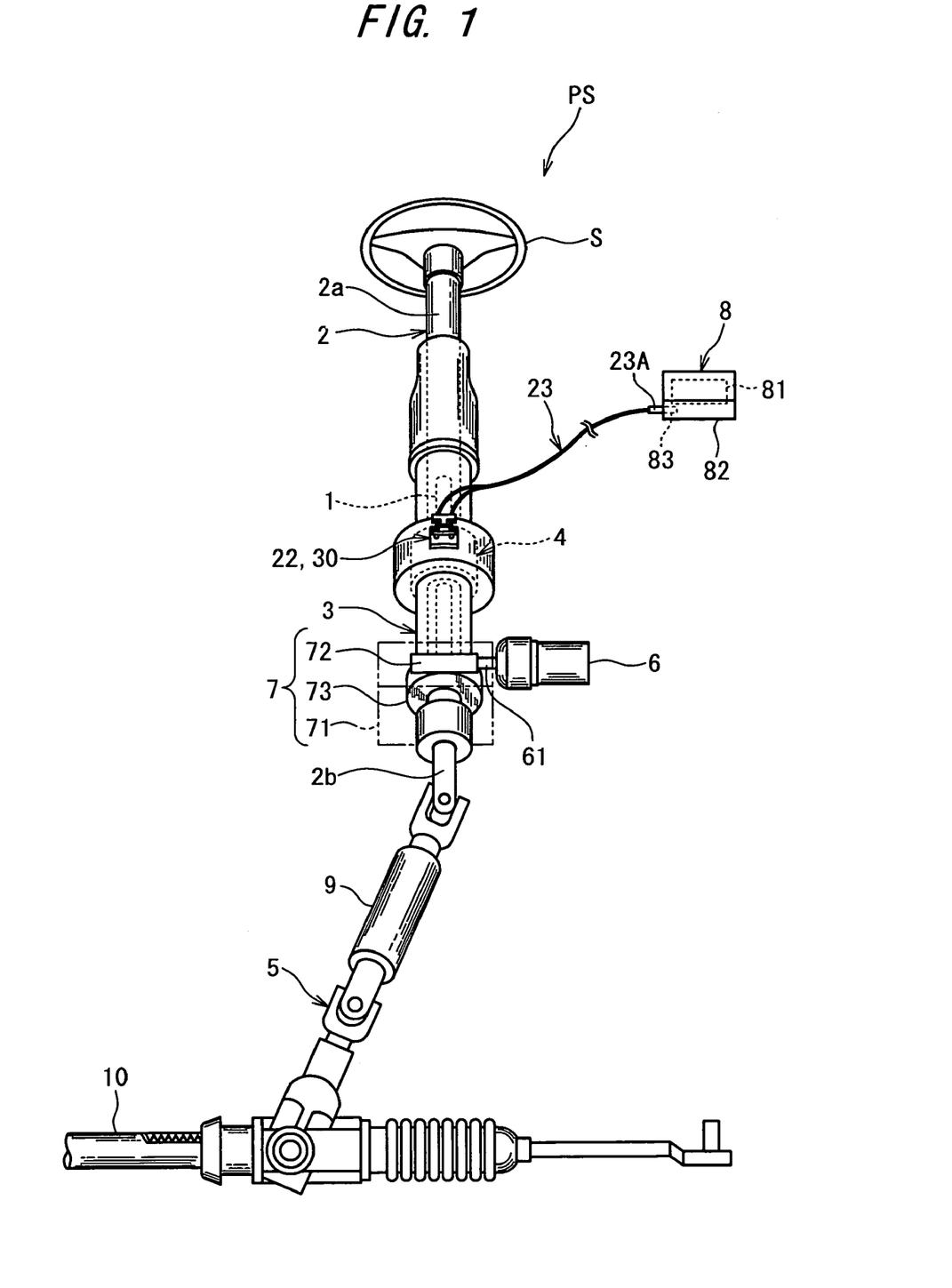
FIG. 1 is a diagram schematically showing an arrangement of an electric power steering assembly according to an embodiment of the present invention.

FIG. 1 schematically shows an electric power steering assembly PS according to an embodiment of the present invention. As shown in FIG. 1, the electric power steering assembly PS includes: a steering shaft 2 as a rotary member having an input shaft 2$a$ and an output shaft 2$b$ coaxially connected with each other via a torsion bar 1; a steering wheel S connected to an upper end of the input shaft 2$a$; a cylindrical housing 3 rotatably supporting the steering shaft 2; a torque sensor 4 accommodated in the housing 3 as disposed on an outer periphery of the steering shaft 2 for detecting a torsion angle of the torsion bar 1; a steering mechanism 5 operatively connected with the output shaft 2$b$; and an electric motor 6 for applying a steering assist force to the steering shaft 2. The electric power steering assembly PS further includes: a gear portion 7 for transmitting the steering assist force from the controlled electric motor 6 to the steering shaft 2; and a control unit 8 for controlling the steering assist force from the electric motor 6 based on a torque detected by the torque sensor 4.

The steering mechanism 5 includes: an intermediate shaft 9 connected to a lower end of the output shaft 2$b$; and a rack and pinion shaft 10 disposed at a lower end of the intermediate shaft 9 for steerably rotating steerable road wheels (not shown). The gear portion 7 includes a worm shaft 72 and a worm wheel 73 meshed with each other in a gear case 71. The worm shaft 72 is fixed to a rotary shaft 61 of the electric motor 6, whereas the worm wheel 73 is connected with the steering shaft 2.

The control unit 8 includes: a control board 81 incorporating a control circuit for detecting a steering torque based on a variation of impedance produced in the torque sensor 4, setting a current value to the electric motor 6 and supplying the set amount of current to the electric motor 6 depending on the detected torque; a box 82 accommodating the control board 81 therein; and a female connector 83 disposed on a side face of the box 82. The female connector 83 is connected with the control board 81 within the box 82. The control board 81 is connected with a battery (not shown) as a power source, so as to supply a current to the torque sensor 4. Furthermore, the electric motor 6 and the control board 81 are interconnected via a connection line (not shown) so that the electric motor 6 may be supplied with a controlled current.

Figure 2:
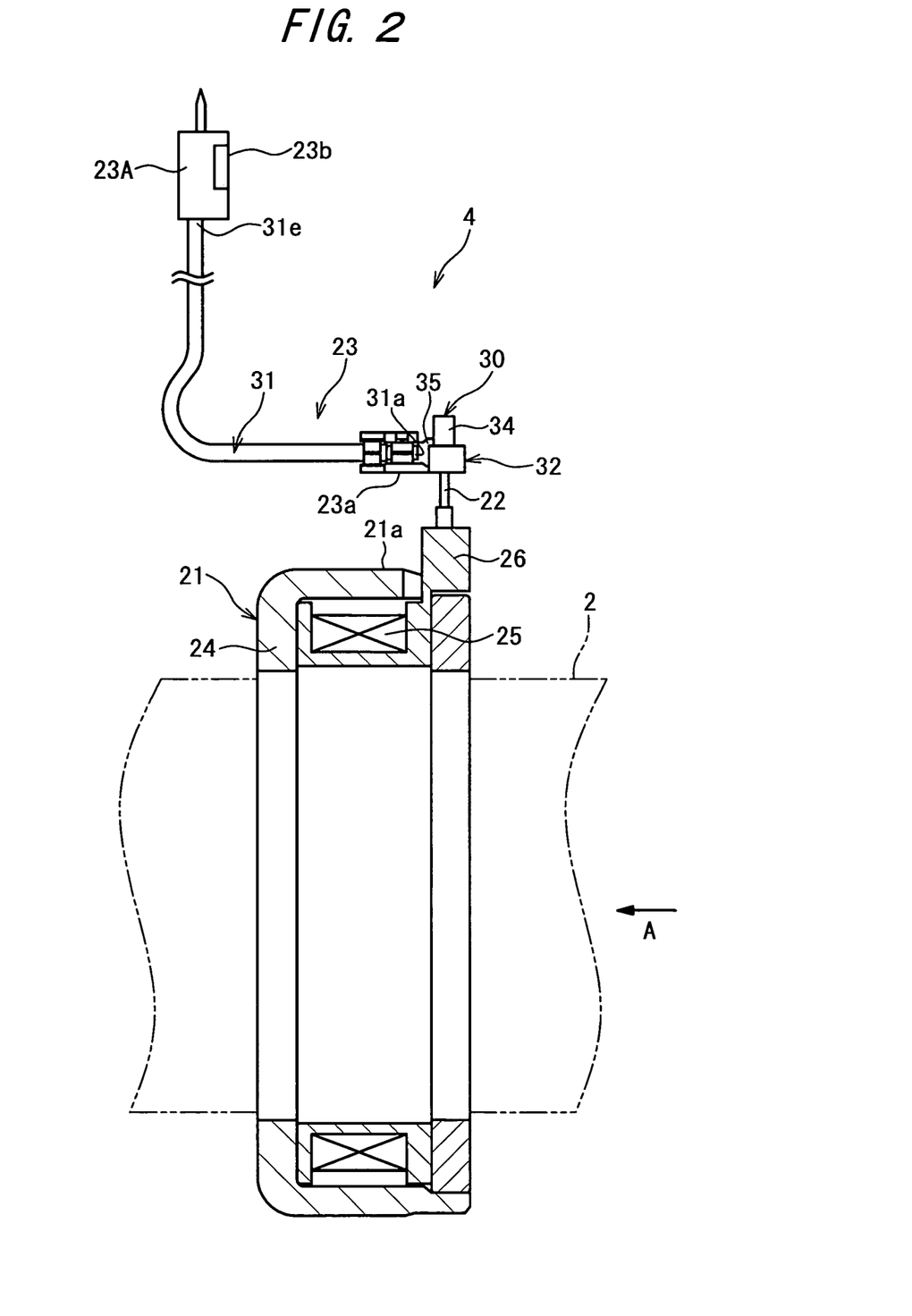
FIG. 2 is a fragmentary sectional view showing a lateral side of a torque sensor.
Figure 3:
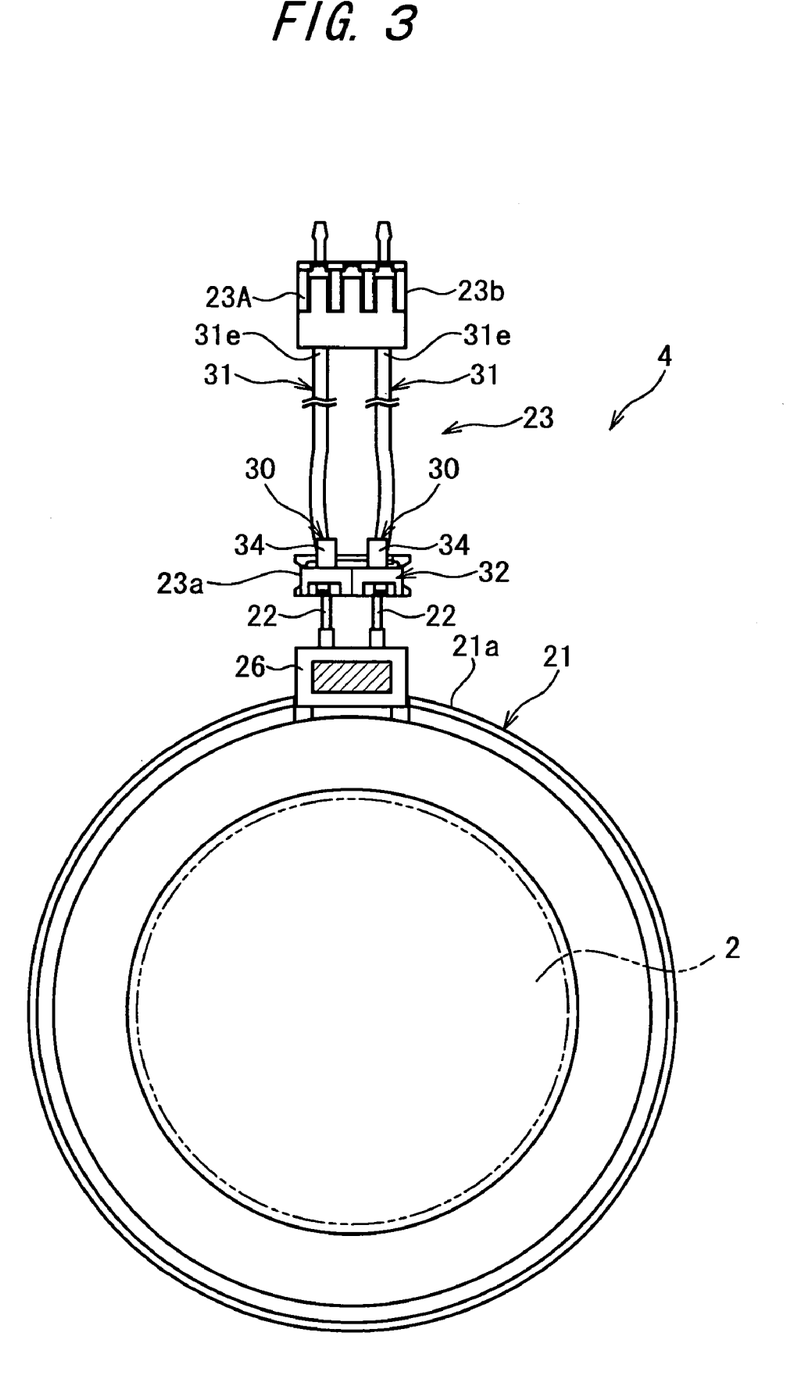
FIG. 3 is a view as seen along a direction of the arrow A in FIG. 2.

FIG. 2 is a sectional side elevation of the torque sensor 4, whereas FIG. 3 is a view as seen along a direction of the arrow A in FIG. 2. FIG. 2 and FIG. 3 depict the steering shaft 2 in a schematic form.

As shown in FIG. 2 and FIG. 3, the torque sensor 4 includes: a sensor coil 21 disposed on an outer periphery of the steering shaft 2 for detecting a torque applied to the steering shaft 2 based on a variation of the impedance; for example, two lead pins 22 projecting from an outer periphery 21a of the sensor coil 21; and a wire harness 23, one end 23a of which is connected with the lead pins 22. The wire harness 23 is provided with a male connector 23A at the other end 23b thereof, the male connector being connected with the female connector 83 of the control unit 8.

The sensor coil 21 includes: a hollow donut-shaped coil case 24; a coil portion 25 accommodated in the coil case 24; and a terminal block 26 projected from an outer periphery of the coil case 24. The two lead pins 22 projects from the terminal block 26 as arranged with a predetermined spacing. Lead wires (not shown) extend outwardly from the coil portion 25 and are wound about the respective lead pins 22. The wound wires are soldered to the respective lead pins.

Figure 4:
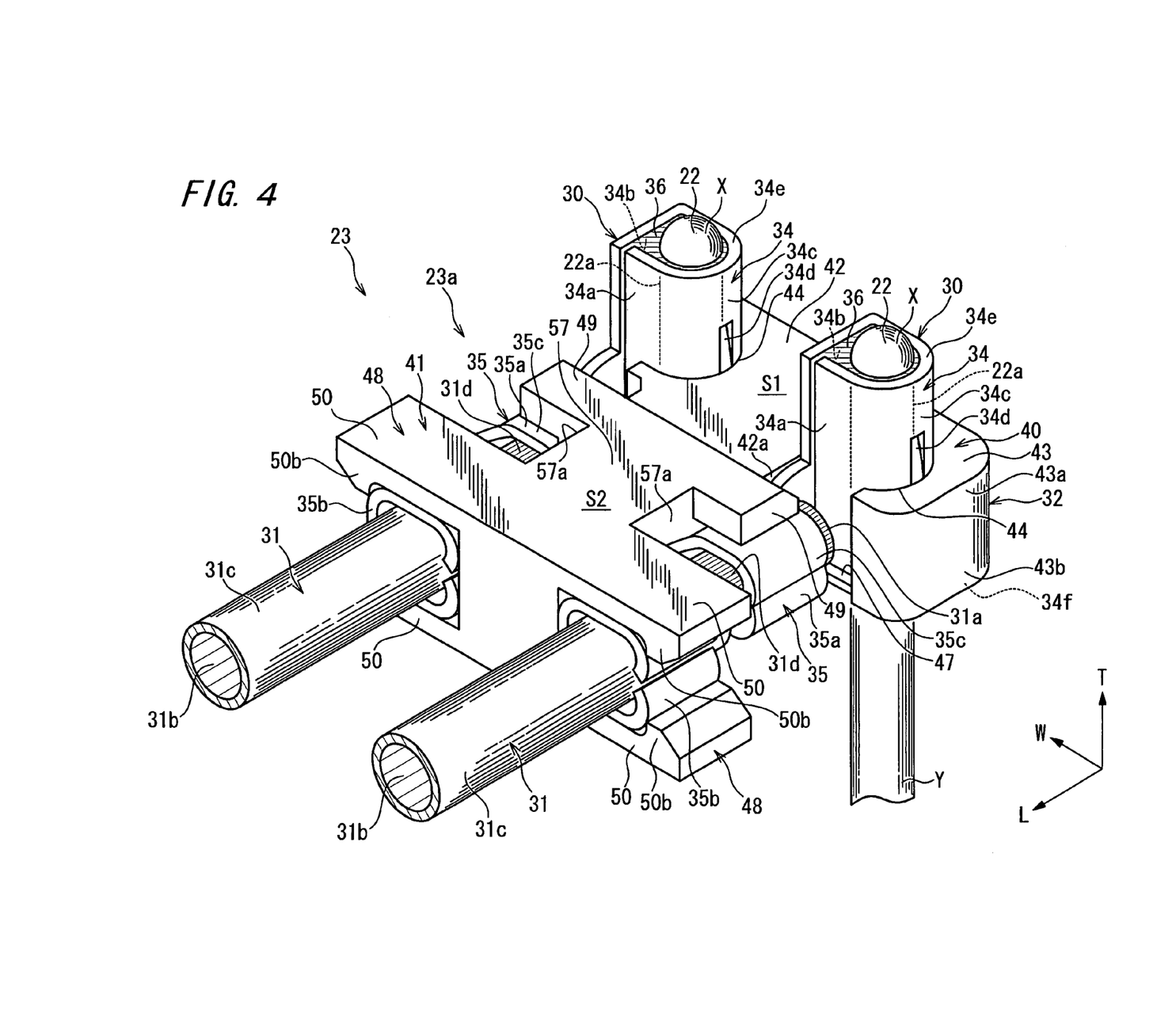
FIG. 4 is a perspective view showing a wire harness.
Figure 5:
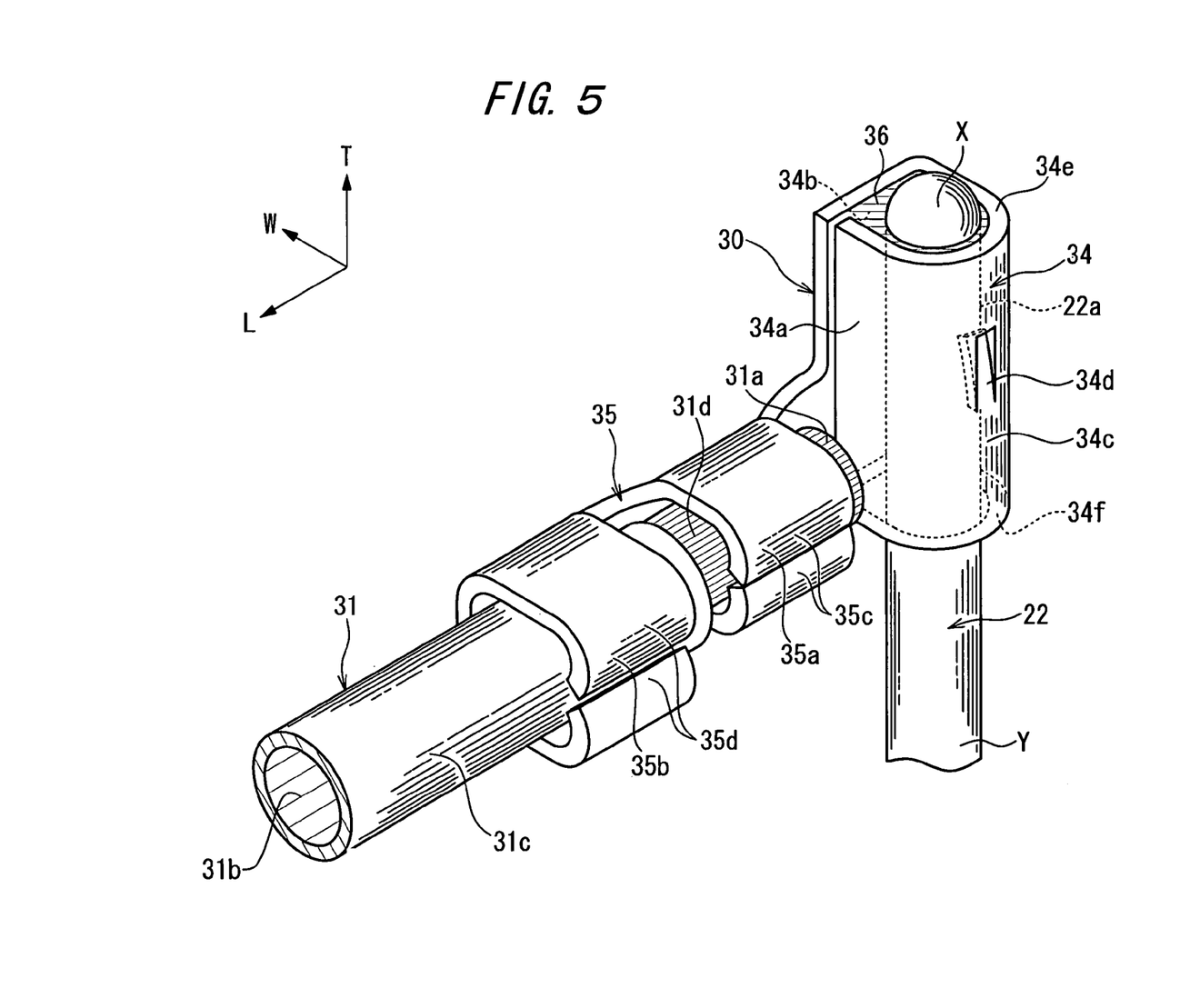
FIG. 5 is a perspective view showing a connection terminal.
Figure 6:
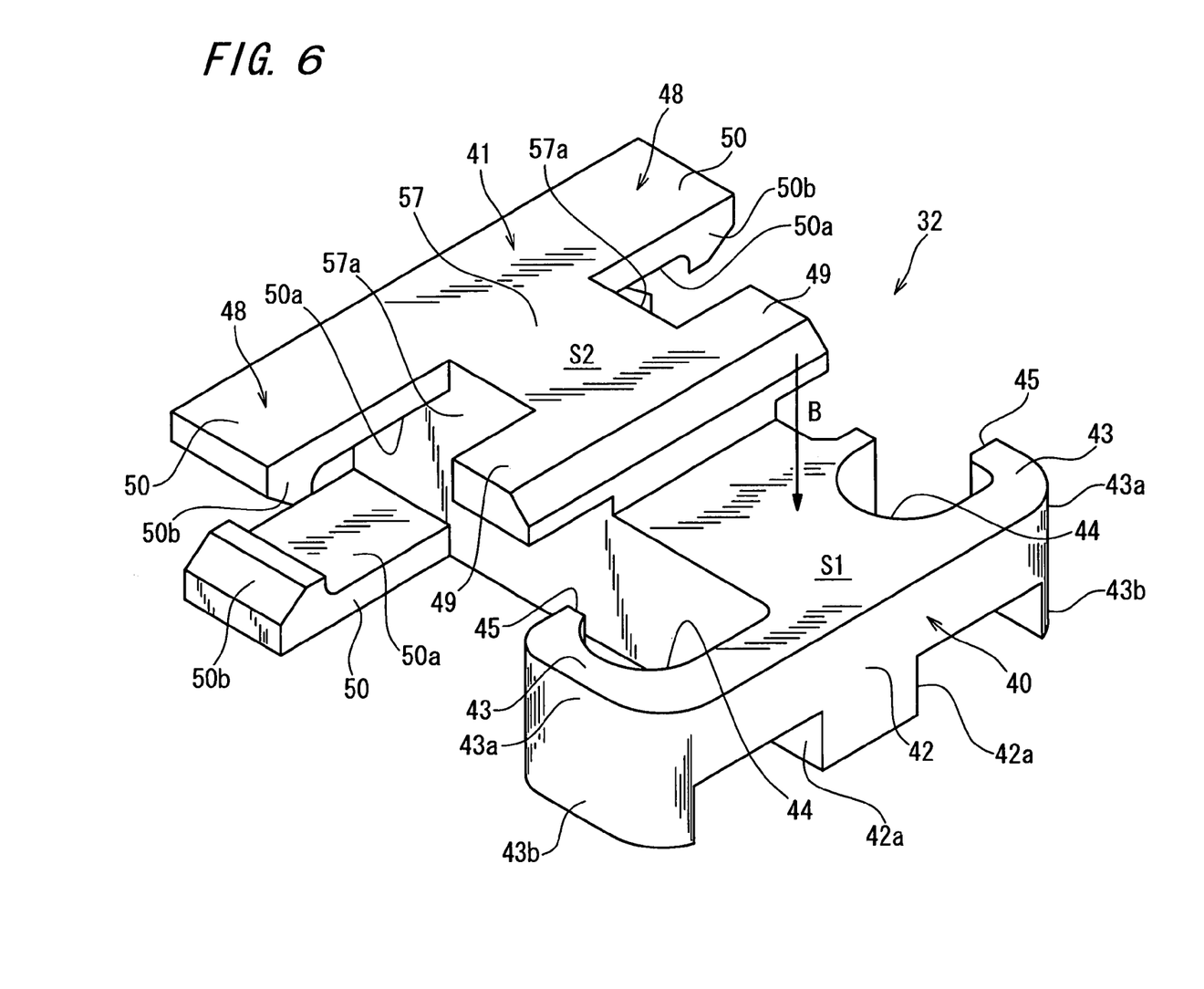
FIG. 6 is a perspective view showing a terminal holder.
Figure 7:
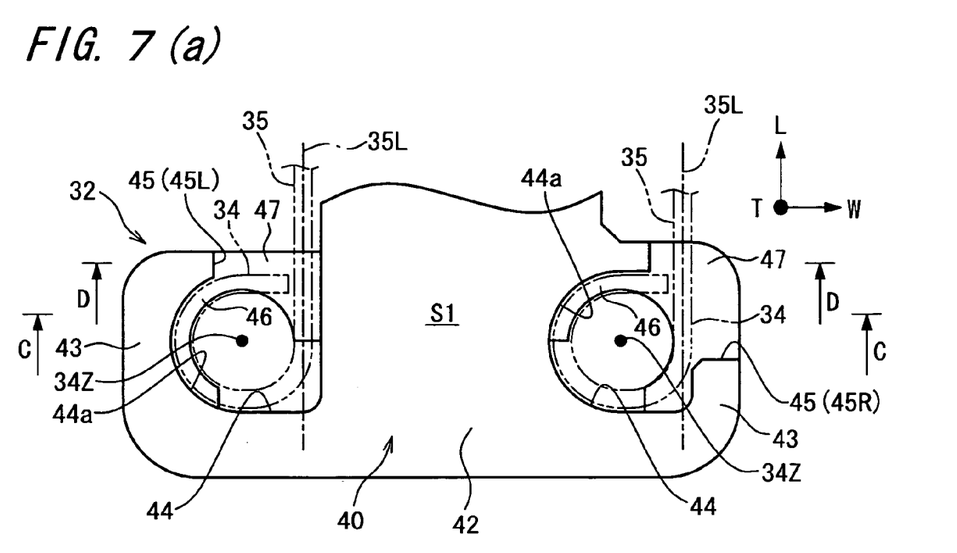

FIG. 4 partially shows the one end 23a of the wire harness 23 connected with the lead pins 22. FIG. 5 shows a connection terminal 30, whereas FIG. 6 shows a terminal holder 32. FIG. 7(a) is a view as seen along a direction of the arrow B in FIG. 6, whereas FIG. 7(b) and FIG. 7(c) are sectional views taken along the line C-C and the line D-D in FIG. 7(a), respectively. For the sake of specific illustration of a principal part, FIG. 5 and FIG. 6 properly omit the illustration of the other portions. In FIG. 4 to FIG. 7, an axial direction of the lead pin 22 is defined as a thickness-wise direction T; a longitudinal direction of the wire harness 23 or a perpendicular direction to the axial direction of the lead pin 22 is defined as a lengthwise direction L; and a direction along which the two lead pins 22 are arranged is defined as widthwise direction W. A projected end of the lead pin 22 is defined as a pin tip, whereas a base portion of the lead pin on the opposite side to the pin tip X is defined as a pin base Y.

As shown in FIG. 4, the wire harness 23 includes: two connection terminals 30 disposed at one end 23a of the wire harness so as to be connected with the two lead pins 22; two conductive lead wires 31 each having one end 31a connected with each of the two connection terminals 30; and an insulating terminal holder 32 for holding the connection terminals 30.

The wire harness 23 with the connection terminals 30 retained by the terminal holder 32 is connected with the lead pins 22 at the pin-tip X sides thereof. The two connection terminals 30 are arranged in a manner to sandwich the terminal holder 32 from opposite sides with respect to the widthwise direction W. The connection terminals are disposed substantially parallel to each other as spaced from each other by a distance equal to a widthwise W pitch between the lead pins 22. The other end 31e of the lead wire 31 is connected with the aforesaid male connector 23A (see FIG. 2, FIG. 3).

As shown in FIG. 4, FIG. 5, the connection terminal 30 includes: a tubular sleeve 34 mounted around each lead pin 22; and a connection portion 35 as a plate-like lead connection portion which extends from an outer periphery 34a of the sleeve 34 in the lengthwise direction L to be connected with the one end 31a of the lead wire 31. A solder 36 is filled in a space between an inner periphery 34b of the sleeve 34 and an outer periphery 22a of the lead pin 22, thereby providing electrical conductivity between the sleeve 34 and the lead pin 22.

The sleeve 34 is formed with a cut-folded portion 34d in a side surface 34c thereof, the cut-folded portion being protruded radially inwardly for elastically pressing the lead pin 22 inserted through the sleeve in a radially inward direction. The cut-folded portion 34d serves to prevent the connection terminal 30 from readily disengaging from the lead pin 22. Furthermore, the cut-folded portion 34d also ensures the electrical conductivity between the sleeve 34 and the lead pin 22 even in the event of incomplete charging of the solder 36.

The lead wire 31 includes: a sheathed wire portion 31c wherein an outer periphery of a conductive lead core 31b is covered by a protective sheath; and a bare wire portion 31d wherein the lead core 31b is exposed by removing the protective sheath at the one end 31a of the lead core 31b.

The connection portion 35 is connected with the outer periphery 34a of the sleeve 34 in a manner to be spaced away from a pin-tip-X-side end face 34e of the sleeve 34 with respect to the thickness-wise direction T toward the pin-base-Y side. The connection portion 35 is formed with a first crimping portion 35a located on a sleeve-34 side with respect to the lengthwise direction L for crimpingly fixing the bare wire portion 31d of the lead wire 31, and a second crimping portion 35b located on the opposite side from the sleeve 34 with respect to the lengthwise direction L for crimpingly fixing the sheathed wire portion 31c.

The first crimping portion 35a includes a pair of first bent pieces 35c which are bent in a manner to embrace the bare wire portion 31d so that the bare wire portion 31d is crimped in the connection portion 35. Thus, the electrical conductivity is ensured between the bare wire portion 31d and the connection portion 35. On the other hand, the second crimping portion 35b includes a pair of second bent pieces 35d which are bent in a manner to embrace the sheathed wire portion 31c so that the sheathed wire portion 31c is crimped in the connection portion 35.

The embodiment employs the two connection terminals 30 having the same configuration. Each connection terminal 30 is formed of one metal sheet cut into a predetermined shape, one end of which is so bent as to form the tubular sleeve 34. Therefore, the production costs are reduced.

As shown in FIG. 4 and FIG. 6, the terminal holder 32 is formed from thermoplastic polyester, for example. The terminal holder 32 includes: a sleeve holder portion 40 for holding the sleeves 34 in mutually spaced relation with respect to the widthwise direction W so as to prevent the sleeves from contacting each other; and a connection-portion holder portion 41 for holding the connection portions 35 in mutually spaced relation with respect to the widthwise direction W so as to prevent the connection portions from bending to contact each other.

The sleeve holder portion 40 includes: a sleeve partitioning wall 42 located between the sleeves 34 for separating the sleeves 34 from each other; and a holder body 43 formed on opposite sides 42a of the sleeve partitioning wall 42 with respect to the widthwise direction W for retaining the respective sleeves 34.

The holder body 43 is formed with two through-holes 44 extended therethrough in the thickness-wise direction T for allowing the respective sleeves 34 to be inserted therethrough. The two through-holes 44 are formed at the same space interval as the widthwise W pitch between the lead pins 22. The holder body 43 is further formed with notches 45 at places where the connection portions 35 are located.

As shown in FIG. 7(a) and FIG. 7(b), each of the through-holes 44 is formed with an arcuate sleeve support 46 at a pin-base-Y-side edge 44a with respect to the thickness-wise direction T, the sleeve support 46 serving to support the sleeve 34 at a base-side end face 34f thereof on the pin-base-Y side. The sleeve support 46 prevents the sleeve 34 from slipping off from the through-hole 44 along the thickness-wise direction T.

As shown in FIG. 7C, the notch 45 is cut in length extending from a pin-tip-X-side end 43a to a portion before a pin-base-Y-side end 43b of the holder body 43 with respect to the thickness-wise direction T. The notch 45 is cut away to a degree that the connection terminal 30 rotated about an axis of the sleeve 34 through a predetermined angle may not make the connection portion 35 contact with the holder body 43 and that the sleeve 34 may not radially slipped off from the through-hole 44. At the pin-base-Y-side end 43b of the holder body 43 with respect to the thickness-wise direction T, a connection-portion support 47 is formed integrally with the sleeve support 46. The connection-portion support 47 supports the connection portion 35 at a pin-base-Y side thereof, thereby inhibiting the connection terminal 30 from moving toward the pin-base-Y side with respect to the thickness-wise direction T.

As to the notches 45 formed in the holder body 43, a left-hand notch 45L as seen in FIG. 7(a) is formed at a non-corresponding position to that of a right-hand notch 45R as seen in the figure. Such a design is made because the two connection terminals 30 have the same configuration, as well as for the purpose of supporting a configuration wherein an axis 34Z of the sleeve 34 is shifted in the widthwise direction W relative to a phantom line 35L defined by extending the connection portion 35 in the lengthwise direction L and wherein the individual connection portions 35 are located in the holder body 43 at non-corresponding positions with respect to the widthwise direction W.

The connection-portion holder portion 41 includes: a connection-portion partitioning wall 57 located between the connection portions 35 for separating the connection portions 35 from each other with respect to the widthwise direction W; and a pair of support portions 48 for removably supporting the connection portions 35 separated by the connection-portion partitioning wall 57.

The connection-portion partitioning wall 57 is formed with a pair of wings 49 at opposite sides 57a thereof with respect to the widthwise direction W. The wing 49 is disposed between the support portion 48 and the holder body 43 with respect to the lengthwise direction L and on the pin-tip-X side relative to the first crimping portion 35a with respect to the thickness-wise direction T. The wing 49 prevents the sleeve 34 from sliding relative to the through-hole 44 of the terminal holder 32 toward the pin-tip-X side with respect to the thickness-wise direction T and slipping off from the through-hole 44.

Each of the support portions 48 includes: a pair of support plates 50 extending from opposite ends of each of the opposite sides 57a of the connection-portion partitioning wall 57 with respect to the thickness-wise direction T in an outward direction with respect to the widthwise direction W; and a pair of claws 50b formed on respective inside surfaces 50a of the support plates 50 with respect to the thickness-wise direction T, and located on respective outward sides of the inside surfaces 50a with respect to the widthwise direction W. The pair of support plates 50 elastically clamp therebetween the second crimping portion 35b of the connection terminal 30. The second crimping portion 35b can be removed from the support portion 48 by elastically deforming the support plates 50 away from each other with respect to the thickness-wise direction T. On the other hand, the pair of claws 50b project inwardly with respect to the thickness-wise direction T, so as to prevent the second crimping portion 35b from readily disengaging from the support portion 48.

The aforesaid terminal holder 32 is formed in a manner that a pin-tip-X-side surface S1 of the sleeve holder portion 40 with respect to the thickness-wise direction T is lowered toward the pin-base-Y side with respect to the thickness-wise direction T relative to a pin-tip-X-side surface S2 of the connection-portion holder portion 41 with respect to the thickness-wise direction T. Thus, the holder body 43 of the sleeve holder portion 40 retains the sleeve 34 at place away from the pin-tip-X-side end face 34e of the sleeve 34 toward the pin-base-Y side with respect to the thickness-wise direction T. The pin-tip-X-side end face 34e of the sleeve 34 projects toward the pin-tip-X side relative to the pin-tip-X-side surface S2 of the connection-portion holder portion 41 with respect to the thickness-wise direction T.

Figure 8:
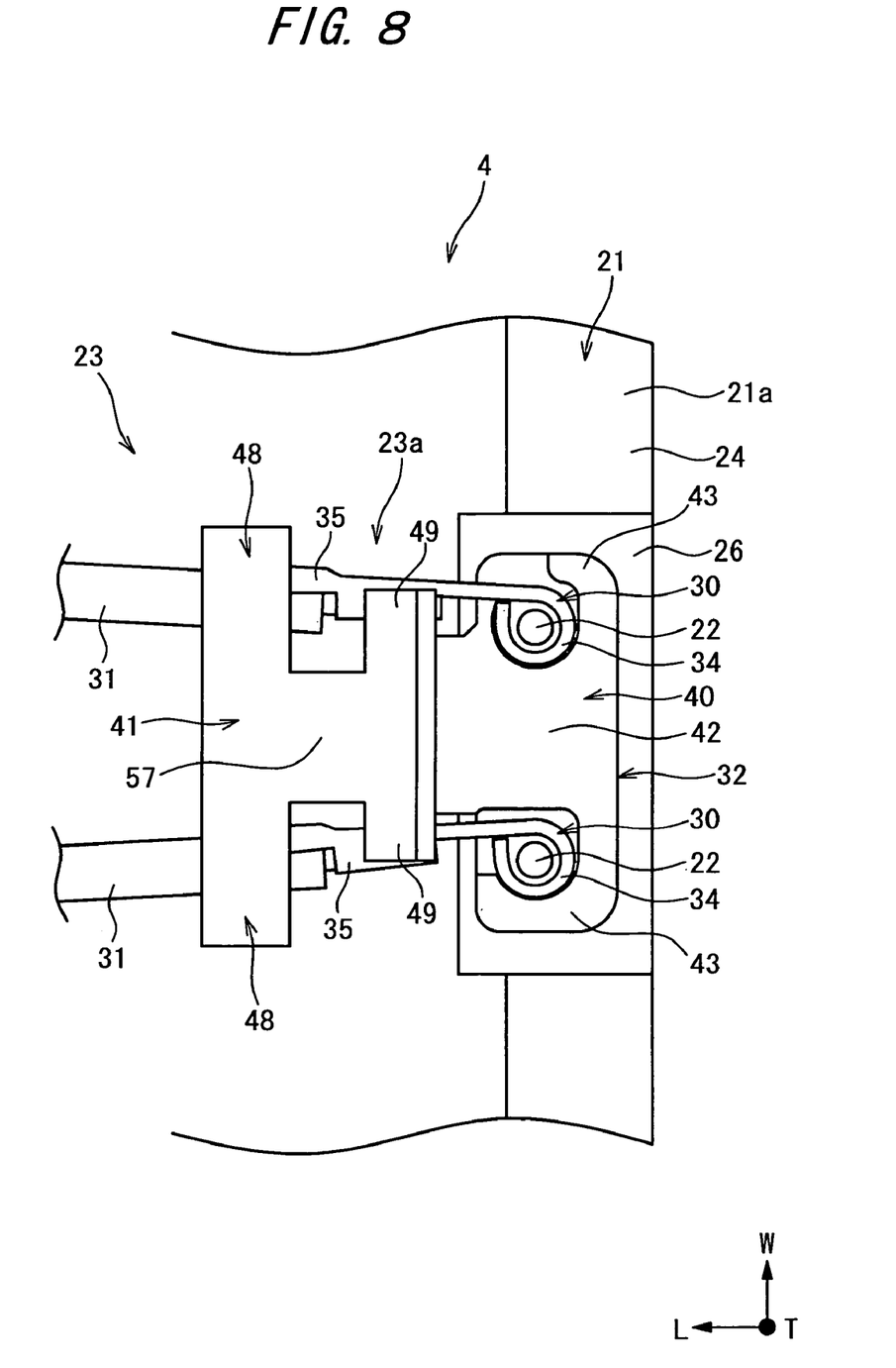
FIG. 8 is a fragmentary plan view showing a wire harness.

According to the embodiment, the terminal holder 32 positions the connection terminals 30 substantially in parallel relation. As shown in FIG. 8, however, the terminal holder 32 may have an alternative arrangement wherein the connection terminals 30 are spaced progressively farther away from each other from a sleeve-34 side toward a connection-portion-35 side with respect to the length-wise direction L, or laid in an open-chevron fashion.

Figure 9:
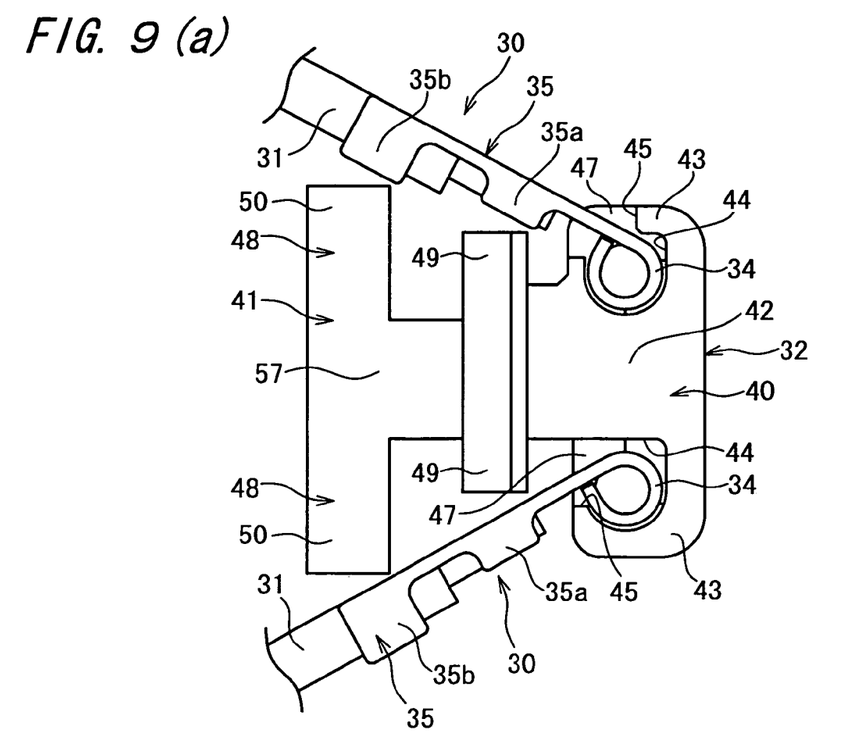
FIG. 9 is a group of diagrams showing the steps of mounting the connection terminals to the terminal holder.

FIG. 9 shows a procedure of mounting the connection terminals 30 to the terminal holder 32.

First, each of the sleeves 34 is inserted into each of the through-holes 44 of the terminal holder 32.

As shown in FIG. 9(a), the connection terminals 30 are laid in the open-chevron fashion wherein the connection terminals 30 are spaced progressively farther away from each other from the sleeve-34 side toward the connection-portion-35 side with respect to the lengthwise direction L. In this state, the sleeves 34 are inserted into the respective through-holes 44 from the base-side end faces 34f thereof. In this insertion operation, the sleeve 34 is inserted into the through-hole 44 to a degree that the base-side end face 34f of the sleeve 34 abuts against the sleeve support 46.

Next, the connection portions 35 are so mounted as to be supported by the respective support portions 48 of the connection-portion holder portion 41.

As shown in FIG. 9(b), the connection terminals 30 laid in the open-chevron fashion are turned about the respective axes of the sleeves 34 so as to bring their connection portions 35 close to each other, thereby the respective second crimping portions 35b of the connection portions 35 are clamped between the respective pair of support plates 50. At this time, the first crimping portions 35a are positioned on the respective pin-base-Y side of the wings 49 with respect to the thickness-wise direction T. Since the holder body 43 is formed with the aforementioned notches 45, the connection terminals 30 can be turned without making the connection portions 35 thereof contact with the holder body 43.

In this manner, the connection terminals 30 can be mounted to the terminal holder 32. The aforementioned procedure may be reversed to remove the connection terminals 30 from the terminal holder 32.

Now, description is made on a soldering operation for bonding the connection terminals 30 to the lead pins 22 of the torque sensor 4.

In the soldering operation, the sleeves 34 of the wire harness 23 having the terminal holder 32 attached to the connection terminals 30 are first mounted around the lead pins 22. With the sleeves 34 mounted around the lead pins 22, the pin tips X of the lead pins 22 are directed downward and dipped into a solder bath containing solder fluidized by heating (not shown). A dipping depth is defined such that tip-side ends 34e of the sleeves 34 touch the surface of the solder fluid in the bath. The solder fluid is sucked up by capillary action so as to be filled into spaces between the inner peripheries 34b of the sleeves 34 and the outer peripheries 22a of the lead pins 22. When the solder is fully charged, some of the solder leaks out from the cut-folded portions 34d. After confirming the out-flow of the solder, the lead pins are drawn out of the solder bath. The solder on the lead pins thus drawn out is air-cooled and solidified. Thus, the soldering operation is completed.

Next, description is made on the operations of the electric power steering assembly PS arranged as described above. A driver operates the steering wheel S thereby producing a steering force on the steering shaft 2. At this time, the torsion bar 1 is twisted while a torsion angle of the torsion bar is detected by means of the torque sensor 4. A detection signal outputted from the sensor coil 21 is sent via the lead pins 22 and the wire harness 23 to the control board 81 incorporating the control circuit, which performs an arithmetic processing based on the signal so as to determine a value of current supplied to the electric motor 6. The current thus set is supplied from the control board 81 to the electric motor 6. A power of the electric motor 6 driven by the supplied current is applied as the steering assist force to the steering shaft 2 via the rotary shaft 61, the worm shaft 72 and the worm wheel 73. In this manner, the steering assist force according to the magnitude of the steering force inputted to the steering wheel S is applied to the steering shaft 2, thus reducing load on the driver operating the steering wheel S.

According to the electric power steering assembly PS arranged as described above, the terminal holder 32 is composed of the sleeve holder portion 40 for holding the sleeves 34 spaced away from each other so as to prevent the sleeves from contacting each other; and the connection-portion holder portion 41 for holding the connection portions 35 spaced away from each other so as to prevent the connection portions from bending to contact each other. Therefore, the one end portion 23a of the wire harness 23 can be connected with the sleeve pins 22 in one operation without connecting each of the connection terminals 30 of the wire harness 23 with each of the lead pins 22 at a time. Then, the sleeves 34 are inserted into the through-holes 44 of the sleeve holder portion 40 so as to be retained by the sleeve holder, whereas the connection portions 35 are retained by the support portions 48 of the connection-portion holder portion 41, whereby the respective connection terminals 30 are retained at the opposite ends thereof with respect to the lengthwise direction L. Therefore, the connection portions 35 are prevented from bending during the soldering operation by dipping. That is, each of the connection terminals 30 can be assuredly fixed to place so that the contact between the connection terminals 30 can be prevented more surely.

The sleeve holder portion 40 is configured to have the lower pin-tip-X-side surface than that of the connection-portion holder portion 41 with respect to the thickness-wise direction W and to retain the sleeves 34 at places away from the pin-tip-X-side end faces 34e of the sleeves 34 toward the pin-base-Y side with respect to the thickness-wise direction T. Therefore, the terminal holder 32 can be prevented from being fusedly damaged by the heat from the high-temperature solder bath during the soldering operation. Furthermore, the connection-portion partitioning wall 57 is located between the connection portions 35 so as to separate the connection portions 35 from each other, whereas the support portions 48 support the connection portions 35 thus separated by the connection-portion partitioning wall 57. Hence, the contact between the connection terminals 30 can be obviated more assuredly. In addition, the terminal holder 32 is separable from the connection terminals 30 so that the terminal holder 32 can be produced as an independent part. Accordingly, the production costs can be reduced as compared with a case where the terminal holder 32 and the connection terminals 30 are produced in one piece.

It is to be noted that the present invention is not limited to foregoing embodiments.

For instance, the terminal holder 32 is applicable to a plural number of lead pins 22. In a case where four lead pins 22 are provided, two terminal holders 32 may be employed or an alternative design may be made such that a single terminal holder supports the four lead pins 22.

Furthermore, the electric power steering assembly PS may have an arrangement wherein the electric motor 6 is disposed at the steering mechanism 5 for applying the steering assist force thereto.

What is claimed is:

1. A torque sensor comprising:
a sensor coil disposed on an outer periphery of a rotary member applied with a torque;
a plurality of lead pins projecting from an outer periphery of the sensor coil; and
a wire harness having one end connected with the lead pins,
wherein the sensor coil detects the torque applied to the rotary member based on a variation of impedance,
wherein the wire harness includes: a plurality of lead wires having electrical conductivity; a plurality of connection terminals each having a tubular sleeve mounted around each of the lead pins and a connection portion extended from an outer periphery of the sleeve in a direction perpendicular to an axial direction of the lead pin to be connected with one end of the lead wire; and an electrically insulating terminal holder for retaining the plural connection terminals,
wherein the terminal holder includes: a sleeve holder holding the sleeves in mutually spaced relation in order to prevent the sleeves from contacting each other; and a connection-portion holder holding the connection portions in mutually spaced relation in order to prevent the connection portions from bending to contact each other,
wherein a pin-tip-side end face of the sleeve projects toward a pin-tip-side surface of the sleeve holder of the terminal holder with respect to the thickness-wise direction of the terminal holder, and
wherein a tip end of the lead pin is exposed from the end face of the sleeve, in order to facilitate connection by means of soldering.

2. A torque sensor according to claim 1, wherein the sleeve holder is formed to have a thickness with respect to the pin axial direction such that a pin-tip-side level thereof is lower than that of the connection-portion holder, and the sleeve holder retains the sleeve at a bottom portion of the sleeve holder that is away from a pin-tip-side end face in the pin axial direction portion of the sleeve holder.

3. A torque sensor according to claim 1 or 2, wherein the connection-portion holder portion comprises: a partitioning wall located between the connection portions for separating the connection portions from each other; and support portions for supporting the connection portions separated by the partitioning wall.

4. A torque sensor according to claim 1 or 2, wherein the sleeve holder is formed with a plurality of through-holes extended therethrough in the pin axial direction for allowing the sleeves to be removably inserted therein, whereas the connection-portion holder portion is configured to allow the connection portions to be removably attached thereto.

5. A wire harness having one end connected to a plurality of lead pins projecting from an outer periphery of a sensor coil, comprising: a plurality of lead wires having electrical conductivity; a plurality of connection terminals each including a tubular sleeve mounted around each of the lead pins and a connection portion extended from an outer periphery of the sleeve in a direction perpendicular to an axial direction of the lead pin so as to be connected with one end of the lead wire; and an electrically insulating terminal holder for holding the plural connection terminals, wherein the terminal holder includes: a sleeve holder for holding the sleeves in mutually spaced relation in order to prevent the sleeves from contacting each other; and a connection-portion holder for holding the connection portions in mutually spaced relation in order to prevent the connection portions from bending to contact each other, wherein a pin-tip-side end face of the sleeve projects toward a pin-tip-side surface of the sleeve holder of the terminal holder with respect to the thickness-wise direction of the terminal holder, and wherein a tip end of the lead pin is exposed from the end face of the sleeve, in order to facilitate connection by means of soldering.

6. An electrical power steering assembly equipped with a torque sensor, comprising:

a steering shaft; a sensor coil disposed on an outer periphery of the steering shaft for detecting a torque applied to the steering shaft; a plurality of lead pins projecting from an outer periphery of the sensor coil; and a control unit for detecting a steering torque based on a variation of impedance produced in the sensor coil and for controlling an electric motor for steering assist, and employing the wire harness according to claim 5 as a wire harness for interconnecting the lead pins and a control board constituting the control unit.

\* \* \* \* \*